United States Patent
Oh et al.

(10) Patent No.: US 11,226,696 B2
(45) Date of Patent: Jan. 18, 2022

(54) DISPLAY DEVICE

(71) Applicant: SAMSUNG DISPLAY CO., LTD., Yongin-si (KR)

(72) Inventors: Jihoon Oh, Hwaseong-si (KR); Myoung-Ha Jeon, Asan-si (KR); Youngsoo Kim, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 127 days.

(21) Appl. No.: 16/817,155

(22) Filed: Mar. 12, 2020

(65) Prior Publication Data
US 2020/0326804 A1 Oct. 15, 2020

(30) Foreign Application Priority Data
Apr. 12, 2019 (KR) .......................... 10-2019-0043083

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 2203/04103* (2013.01); *G06F 2203/04107* (2013.01)

(58) Field of Classification Search
None
See application file for complete search history.

(56) References Cited

U.S. PATENT DOCUMENTS

| 2012/0119322 A1* | 5/2012 | Tada ................. G02F 1/136209 257/506 |
| 2013/0148312 A1 | 6/2013 | Han et al. |
| 2014/0354924 A1* | 12/2014 | Byun ................ G02F 1/133514 349/106 |
| 2015/0277635 A1* | 10/2015 | Kim ........................ G06F 3/047 345/173 |

FOREIGN PATENT DOCUMENTS

| KR | 20130071140 | 8/2013 |
| KR | 101854695 | 5/2018 |

* cited by examiner

*Primary Examiner* — Parul H Gupta
(74) *Attorney, Agent, or Firm* — F. Chau & Associates, LLC

(57) ABSTRACT

A display device includes a display panel that includes a flat part and a protruding part adjacent to one side of the flat part, a touch panel disposed on the display panel, a touch connection circuit board disposed at one side of the touch panel and electrically connected to the touch panel, and a protective layer disposed on one surface of the touch connection circuit board and that overlaps the protruding part. The touch connection circuit board includes a base film, a first dummy pattern disposed on the base film and adjacent to one edge of the base film, a second dummy pattern disposed on the base film and adjacent to an other edge of the base film, and a line pattern section disposed between the first and second dummy patterns. The protective layer covers the line pattern section between the first and second dummy patterns.

20 Claims, 13 Drawing Sheets

DISPLAY DEVICE

CROSS-REFERENCE TO RELATED APPLICATION

This U.S. nonprovisional application claims priority under 35 U.S.C. § 119 from, and the benefit of, Korean Patent Application No. 10-2019-0043083, filed on Apr. 12, 2019 in the Korean Intellectual Property Office, the contents of which are herein incorporated by reference in their entirety.

BACKGROUND

Embodiments of the present inventive concepts are directed to a display device, and more particularly to, a display device with a reduced bezel.

Various types of display devices are used to provide image information. Display devices typically include a display panel that is divided into an active area and an inactive area, and a touch panel that has a sensing area and a non-sensing area. The inactive or non-sensing areas include pads connected to a circuit board that control pixels in a display area or control sensing electrodes in the sensing area.

A flexible display device has recently been developed in which an inactive or non-sensing area can be bent to increase visibility and to decrease dead spaces, and a protective layer is being developed that can effectively protect a connection circuit board at a bendable portion in a flexible display device.

SUMMARY

Some exemplary embodiments of the present inventive concepts can provide a display device in which a configuration of a touch connection circuit board is changed to prevent the flow of a protective layer that protects the touch connection circuit board.

Some exemplary embodiments of the present inventive concepts can provide a display device whose reliability is improved due to prevention of the flow of a protective layer that protects a touch connection circuit board.

According to some exemplary embodiments of the present inventive concepts, a display device includes: a display panel that includes a flat part and a protruding part adjacent to one side of the flat part; a touch panel disposed on the display panel; a touch connection circuit board disposed at one side of the touch panel and that is electrically connected to the touch panel; and a protective layer disposed on one surface of the touch connection circuit board and that overlaps the protruding part of the display panel. The touch connection circuit board includes: a base film; a first dummy pattern disposed on the base film and adjacent to one edge of the base film; a second dummy pattern disposed on the base film and adjacent to an other edge of the base film; and a line pattern section disposed between the first dummy pattern and the second dummy pattern. The protective layer covers the line pattern section between the first dummy pattern and the second dummy pattern.

In certain embodiments, the protruding part includes a bendable part that is configured to be bent about a bending axis that extends in one direction. The protective layer overlaps the bendable part.

In certain embodiments, the line pattern section includes a plurality of connection lines that extend in a first direction. The first dummy pattern, the connection lines, and the second dummy pattern are spaced apart from each other in a second direction that intersects the first direction.

In certain embodiments, the first dummy pattern and the second dummy pattern include a same material as the connection lines.

In certain embodiments, the touch connection circuit board further includes at least one cover layer disposed on the base film.

In certain embodiments, each of the first dummy pattern and the second dummy pattern extends from the at least one cover layer.

In certain embodiments, the at least one cover layer includes a dielectric layer that covers the connection lines. Each of the first dummy pattern and the second dummy pattern is integrated into a single body together with the dielectric layer.

In certain embodiments, the at least one cover layer includes: a dielectric layer that covers the connection lines; and a printed layer disposed on the dielectric layer. Each of the first dummy pattern and the second dummy pattern includes: a first sub-dummy layer integrated into a single body together with the dielectric layer; and a second sub-dummy layer disposed on the first sub-dummy layer and integrated into a single body together with the printed layer.

In certain embodiments, the at least one cover layer includes: a dielectric layer that covers the connection lines; and a printed layer disposed on the dielectric layer. Each of the first dummy pattern and the second dummy pattern includes: a sub-dummy layer integrated into a single body together with the dielectric layer; and a cover dummy layer that covers a top surface and a lateral surface of the sub-dummy layer. The cover dummy layer may include a same material as the printed layer.

In certain embodiments, the touch connection circuit board includes a shield area and a connection area adjacent to the shield area. The first dummy pattern, the second dummy pattern, and the line pattern section are disposed on connection area. A minimum distance from one end of the connection area to the first dummy pattern or the second dummy pattern may be greater than a minimum distance from the one end of the connection area to the line pattern section.

In certain embodiments, the touch panel includes a sensing area and a non-sensing area. The touch panel further includes: a sensing electrode disposed on the sensing area; a sensing pad disposed on the non-sensing area; and a sensing line that connects the sensing electrode and the sensing pad to each other.

In certain embodiments, the touch connection circuit board is electrically connected to the sensing pad. The touch connection circuit board is configured to be bent in a direction toward a bottom surface of the touch panel.

In certain embodiments, the display device further includes a coupling member formed between the sensing pad and the touch connection circuit board.

In certain embodiments, the display device further includes a window panel disposed on the touch panel. The window panel includes a transmission area and a bezel area that surrounds the transmission area. The protective layer overlaps the bezel area.

According to some exemplary embodiments of the present inventive concepts, a display device includes: a display panel that includes a flat part and a bendable part adjacent to one side of the flat part, where the bendable part is configured to be bent about a bending axis that extends in one direction; a touch panel disposed on the display panel; a touch connection circuit board disposed on one side of the touch panel and electrically connected to the touch panel, where the touch connection circuit board is configured to be bent in a direction toward a bottom surface of the touch panel; and a protective layer disposed on the touch connection circuit board and that overlaps the bendable part. The touch connection circuit board includes: a base film; a first dummy pattern disposed on the base film and adjacent to one edge of the base film; a second dummy pattern disposed on the base film and adjacent to an other edge of the base film; and a plurality of connection lines disposed between the first dummy pattern and the second dummy pattern. The protective layer covers the connection lines between the first dummy pattern and the second dummy pattern.

In certain embodiments, the first dummy pattern and the second dummy pattern include a same material as the connection lines.

In certain embodiments, the touch connection circuit board further includes at least one cover layer disposed on the base film. Each of the first dummy pattern and the second dummy pattern extends from the at least one cover layer.

In certain embodiments, the touch connection circuit board includes a shield area and a connection area adjacent to the shield area. The first dummy pattern, the second dummy pattern, and the connection lines are disposed on the connection area.

According to some exemplary embodiments of the present inventive concepts, a display device includes: a touch panel; a touch connection circuit board disposed at one side of the touch panel and that is electrically connected to the touch panel, wherein the touch connection circuit board is configured to be bent about a bending axis that extends in one direction; and a protective layer disposed on one surface of the touch connection circuit board. The touch connection circuit board includes: a base film; a first dummy pattern disposed on the base film and adjacent to one edge of the base film; a second dummy pattern disposed on the base film and adjacent to an other edge of the base film; a line pattern section disposed between the first dummy pattern and the second dummy pattern, and at least one cover layer disposed on the base film. Each of the first dummy pattern and the second dummy pattern extends from the at least one cover layer, and the protective layer covers the line pattern section between the first dummy pattern and the second dummy pattern.

The display device further includes a display panel that includes a flat part and a protruding part adjacent to one side of the flat part, where the touch panel is disposed on the display panel, and the protruding part overlaps the protective layer. The protruding part includes a bendable part that is configured to be bent about the bending axis, and the protective layer overlaps the bendable part.

DETAILED DESCRIPTION OF EMBODIMENTS

Figure 1:
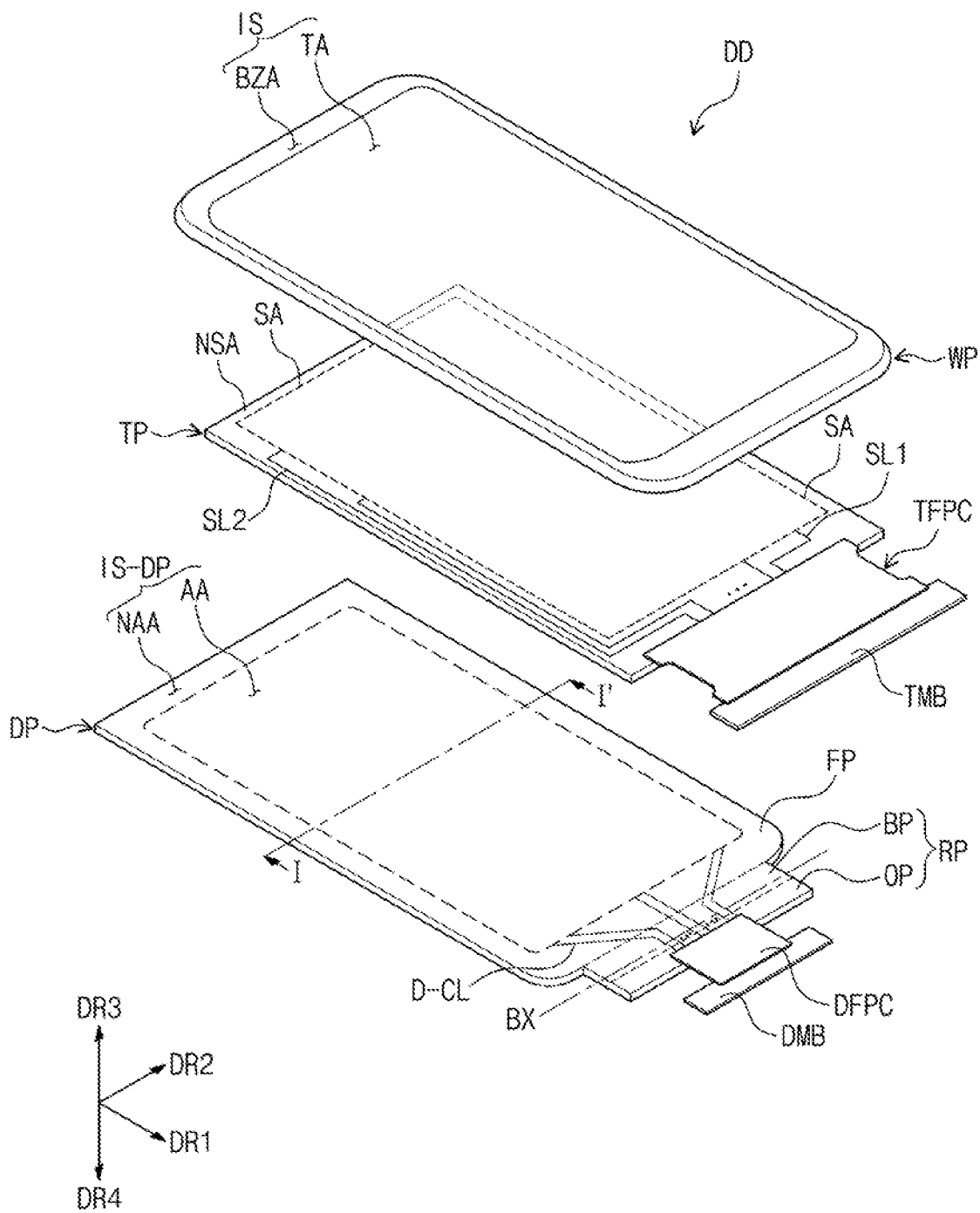
FIG. 1 is an exploded perspective view of a display device according to some exemplary embodiments.

While embodiments of the present inventive concepts are open to various modifications and alternatives embodiments, exemplary embodiments thereof are shown by way of example in the drawings and will be described in detail. However, it should be understood that there is no intention to limit the present inventive concepts to the particular embodiments disclosed, but on the other hand, the present inventive concepts are to cover all modifications, equivalents, and alternatives falling within the spirit and scope thereof.

In this description, when a certain component (or region, layer, portion, etc.) is referred to as being "on", "connected to", or "coupled to" other component(s), the certain component may be directly disposed on, directly connected to, or directly coupled to the other component(s) or at least one intervening component may be present therebetween.

Like numerals may indicate like components. Moreover, in the drawings, thicknesses, ratios, and dimensions of components may be exaggerated to more effectively illustrate the technical contents.

The following will now describe a display device according to some exemplary embodiments of the present inventive concepts in conjunction with the accompanying drawings.

Figure 2:
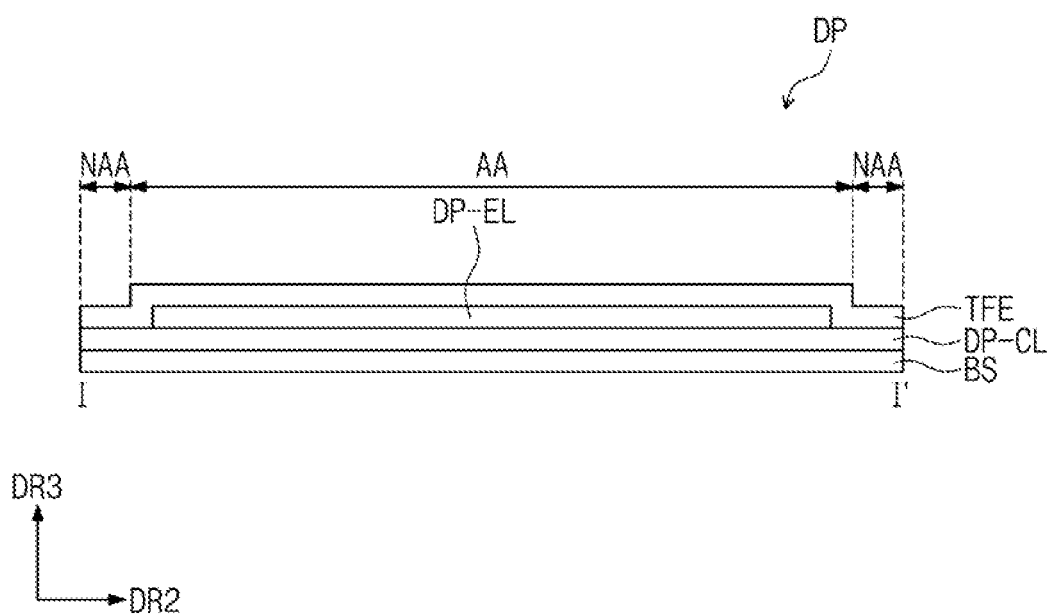
FIG. 2 is a cross-sectional view of a display panel according to some exemplary embodiments.
Figure 3:
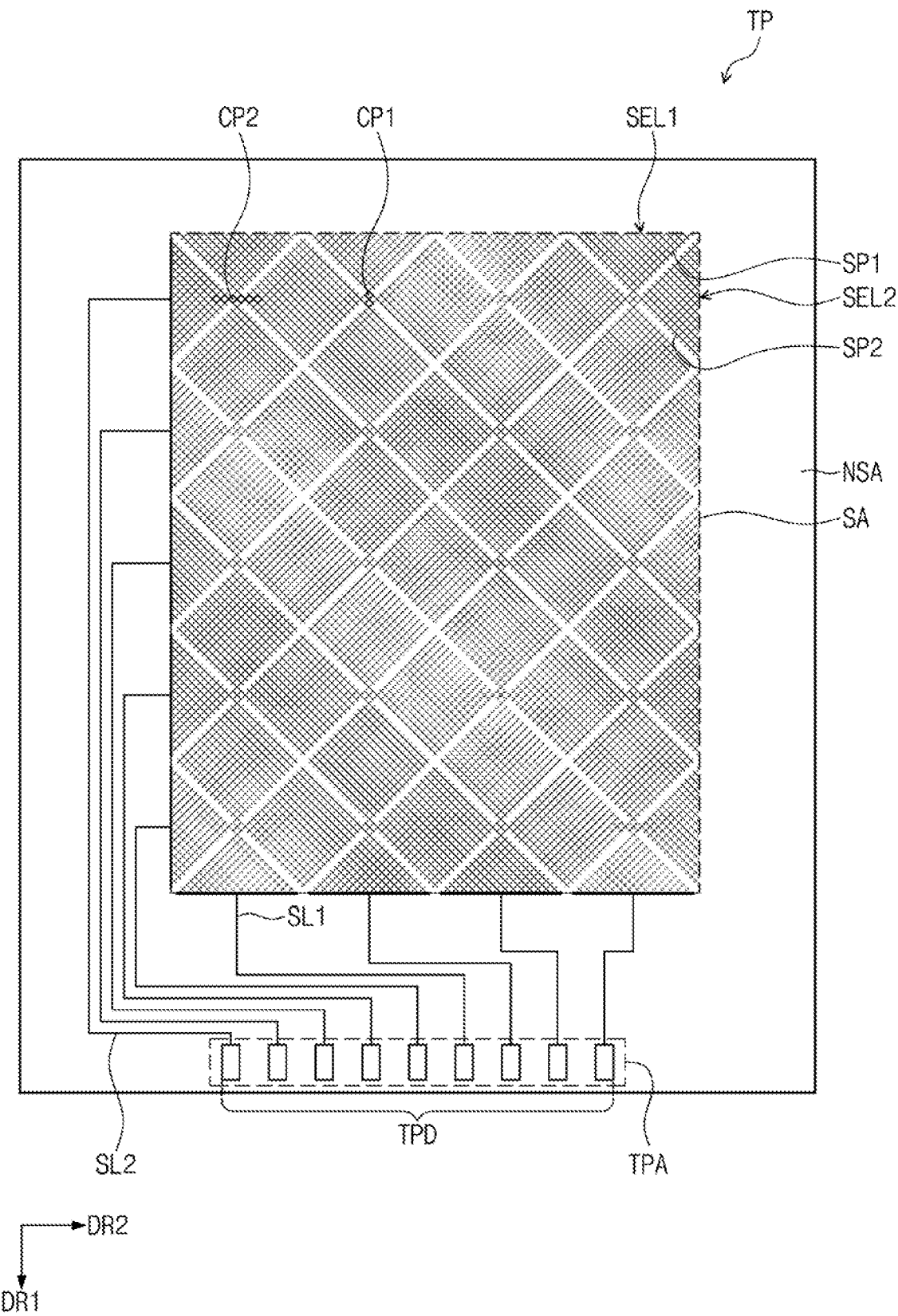
FIG. 3 is a plan view of a touch panel according to some exemplary embodiments.
Figure 4:
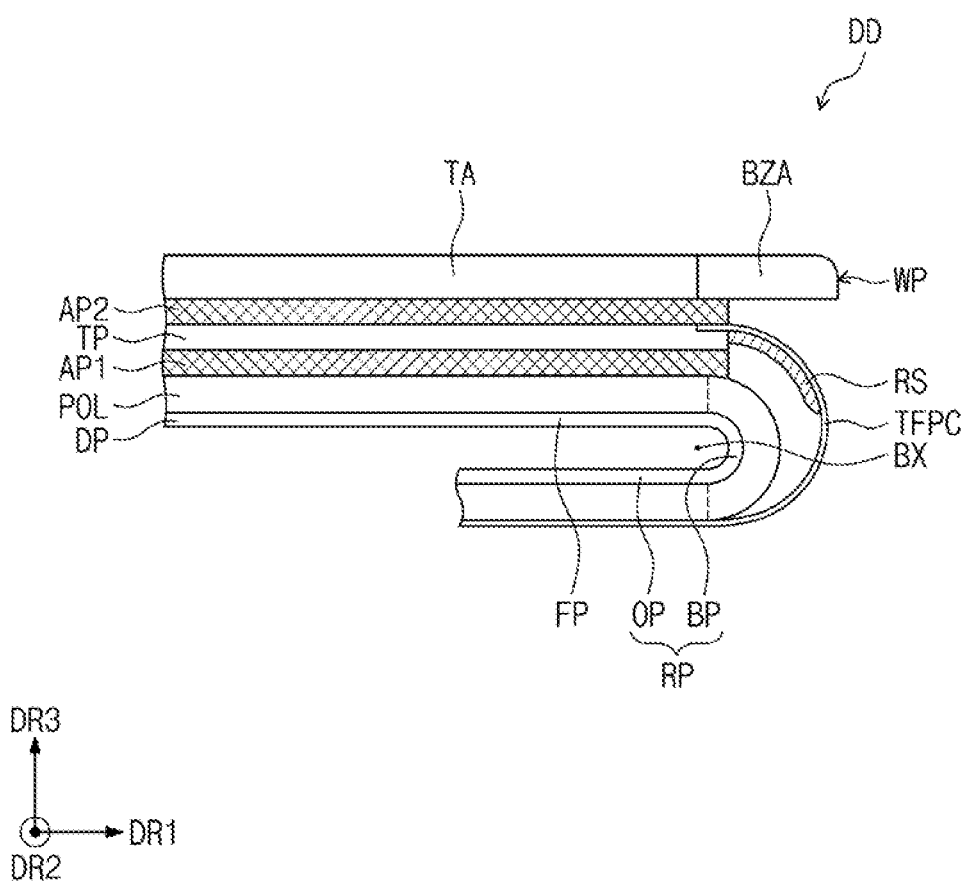
FIG. 4 is a cross-sectional view of a display device according to some exemplary embodiments.

FIG. 1 is an exploded perspective view of a display device according to some exemplary embodiments. FIG. 2 is a cross-sectional view of a display panel according to some exemplary embodiments. FIG. 3 is a plan view of a touch panel according to some exemplary embodiments. FIG. 4 is a cross-sectional view of a display device according to some exemplary embodiments.

A display device DD according to certain embodiments may be a large-sized display apparatus for televisions, monitors, or outdoor billboards. In addition, the display device DD may be a small and medium-sized display apparatus for personal computers, laptop computers, personal digital terminals, automotive navigation units, game consoles, smart phones, tablet computers, or cameras. These items are merely presented as examples, and the display device DD can be adopted for any other display apparatus unless departing from the spirit of the present inventive concepts.

The display device DD according to certain embodiments includes a display panel DP, a touch panel TP, and a touch connection circuit board TFPC that electrically connects a touch driver circuit board TMB to the touch panel TP. The display device DD further includes a window panel WP disposed on the touch panel TP.

According to certain embodiments, the figures show first, second, third, and fourth directional axes DR1, DR2, DR3, and DR4, referred to hereinbelow as first, second, third, and fourth axes DR1, DR2, DR3, and DR4, and in this description, directions indicated by the first to fourth axes DR1 to DR4 are relative and can be changed to other directions.

In this disclosure, for convenience of description, the third axis DR3 refers to a direction in which an image is displayed to a user, and the fourth axis DR4 denotes a direction reverse to that indicated by the third axis DR3. Further, the first axis DR1 and the second axis DR2 may be perpendicular to each other, and the third axis DR3 and the fourth axis DR4 are each normal to a plane defined by the first axis DR1 and the second axis DR2. In FIG. 1, a plane defined by the first and second axes DR1 and DR2 is parallel to a display surface on which an image is provided.

According to certain embodiments, the touch connection circuit board TFPC is electrically connected to the touch panel TP. A protective layer RS is disposed on one surface of the touch connection circuit board TFPC. The touch connection circuit board TFPC has the protective layer RS between dummy layers DM1 and DM2, shown in FIG. 5, of the touch connection circuit board TFPC. The protective layer RS is positioned between the touch connection circuit board TFPC and the display panel DP.

Referring to FIG. 1, according to certain embodiments, the window panel WP of the display device DD includes a transmission area TA and a bezel area BZA. The window panel WP, including the transmission area TA and the bezel area BZA, has a front surface IS that corresponds to that of the display device DD. Users can perceive an image displayed through the transmission area TA.

In FIG. 1, according to certain embodiments, vertices of the transmission area TA are depicted as having rounded rectangular shapes. However, this is exemplary and non-limiting, and in other embodiment, the shape of the transmission area TA is not limited thereto, and may be variously changed.

According to certain embodiments, the bezel area BZA is adjacent to the transmission area TA. The bezel area BZA may have a color. The bezel area BZA surrounds the transmission area TA. Therefore, the bezel area BZA substantially determines the shape of the transmission area TA. However, this is exemplary and non-limiting, and in other embodiments, the bezel area BZA may be disposed adjacent to only one side of the transmission area TA or there may be no bezel area.

In the display device DD, according to certain embodiments, the protective layer RS overlaps the bezel area BZA. The protective layer RS and the touch connection circuit board TFPC can be bent to overlap the bezel area BZA. The protective layer RS is formed on a bendable part of the touch connection circuit board TFPC, and bendable part of the touch connection circuit board TFPC overlaps the bendable part BP of the display panel DP. Because the protective layer RS and the touch connection circuit board TFPC can be bent, the bezel area BZA has a reduced area, and accordingly, a dead space decreases in the display device DD.

According to certain embodiments, the display panel DP of the display device DD is an emission type display panel. For example, the display panel DP may be an organic electroluminescence display panel or a quantum dot emission display panel. Embodiments of the present inventive concepts, however, are not limited thereto.

According to certain embodiments, the display panel DP includes a base substrate BS, a circuit layer DP-CL disposed on the base substrate BS, a display device layer DP-EL disposed on the circuit layer DP-CL, and an encapsulation layer TFE that covers the display device layer DP-EL.

According to certain embodiments, the base substrate BS provides a base surface on which the display device layer DP-EL is disposed. The base substrate BS may be one of a glass substrate, a metal substrate, or a plastic substrate, etc. Embodiments of the present inventive concepts, however, are not limited thereto, and the base substrate BS may be an inorganic layer, an organic layer, or a composite material layer. The base substrate BS is a flexible substrate that is easily bent or folded.

In certain embodiments, the circuit layer DP-CL is disposed on the base substrate BS, and includes a plurality of transistors. The transistors each include a control electrode, an input electrode, and an output electrode. For example, the circuit layer DP-CL includes a switching transistor and a driver transistor that drives a plurality of light emitting devices in the display device layer DP-EL.

According to certain embodiments, a plurality of light emitting devices that are spaced apart from each other are included in the display device layer DP-EL that emit light in different wavelength bands from each other. Embodiments of the present inventive concepts, however, are not limited thereto. The light emitting devices may emit light in the same wavelength band, or at least one of the light emitting devices may emit light whose wavelength band differs from those of other light emitting devices.

According to certain embodiments, the light emitting device includes a light emitting layer between electrodes that face each other. When the display panel DP is an organic electroluminescence display panel, the light emitting layer includes one of an anthracene derivative, a pyrene derivative, a fluoranthene derivative, a chrysene derivative, a dihydrobenzanthracene derivative, or a triphenylene derivative. For example, the light emitting layer includes anthracene derivatives or pyrene derivatives.

According to certain embodiments, when the display panel DP is an organic electroluminescence display panel, the light emitting layer includes a host and a dopant, and a material of the host includes one or more of DPEPO (bis[2-(diphenylphosphino)phenyl]ether oxide), CBP (4,4'-bis(carbazol-9-yl)biphenyl), mCP (1,3-bis(carbazol-9-yl)benzene), PPF (2,8-bis(diphenylphosphoryl)dibenzo[b,d]furan), TcTa (4,4',4"-tris(carbazol-9-yl)-triphenylamine), or TPBi (1,3,5-tris(N-phenylbenzimidazole-2-yl)benzene). Embodiments of the present inventive concepts, however, are not limited thereto. In other embodiments, the host material may include one or more of Alq3 (tris(8-hydroxyquinolino)aluminum), CBP (4,4'-bis(N-carbazolyl)-1,1'-biphenyl), PVK (poly(N-vinylcarbazole), AND (9,10-di(naphthalene-2-yl)anthracene), TCTA (4,4',4"-tris(carbazol-9-yl)-triphenylamine), TPBi (1,3,5-tris(N-phenylbenzimidazole-2-yl)benzene), TBADN (3-tert-butyl-9,10-di(naphth-2-yl) anthracene), DSA (distyrylarylene), CDBP (4,4-bis(9-carbazolyl)-2,2-dimethyl-biphenyl), MADN (2-methyl-9,10-bis(naphthalen-2-yl)anthracene), CP1 (hexaphenyl cyclotriphosphazene), UGH2 (1,4-bis(triphenylsilyl)benzene), DPSiO3 (hexaphenylcyclotrisiloxane), DPSiO4 (octaphenylcyclotetra siloxane), or PPF (2,8-bis(diphenylphosphoryl)dibenzofuran).

According to certain embodiments, a dopant material included in the light emitting layer includes one or more of a styryl derivative (e.g., 1,4-bis[2-(3-N-ethylcarbazoryl)vinyl]benzene (BCzVB), 4-(di-p-tolylamino)-4'-[(di-p-tolylamino)styryl]stilbene (DPAVB), N-(4-((E)-2-(6-((E)-4-(diphenylamino)styryl)naphthalen-2-yl)vinyl)phenyl)-N-phenylben zenamine (N-BDAVBi)), a perylene or its derivatives (e.g., 2,5,8,11-tetra-t-butylperylene (TBP)), or pyrene or its derivatives (e.g., 1,1-dipyrene, 1,4-dipyrenylbenzene, or 1,4-bis(N, N-diphenylamino)pyrene).

According to certain embodiments, when the display panel DP is a quantum dot light emission display panel, the display panel DP includes a quantum dot material in the light emitting layer. A quantum dot core is selected from one of a I-VI group compound, a III-V group compound, a IV-VI group compound, a IV group element, a IV group compound, or a combination thereof.

According to certain embodiments, the II-VI group compounds can be one or more of a binary compound selected from CdSe, CdTe, ZnS, ZnSe, ZnTe, ZnO, HgS, HgSe, HgTe, MgSe, MgS, or a mixture thereof; a ternary compound selected from AgInS, CuInS, CdSeS, CdSeTe, CdSTe, ZnSeS, ZnSeTe, ZnSTe, HgScS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a mixture thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, or a mixture thereof.

According to certain embodiments, the III-V group compound can be one or more of a binary compound selected from GaN, GaP, GaAs, GaSb, AlN, AlP, AlAs, AlSb, InN, InP, InAs, InSb, or a mixture thereof; a ternary compound selected from GaNP, GaNAs, GaNSb, GaPAs, GaPSb, AlNP, AlNAs, AlNSb, AlPAs, AlPSb, InGaP, InNP, InNAs, InNSb, InPAs, InPSb, GaAlNP, or a mixture thereof; or a quaternary compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a mixture thereof.

According to certain embodiments, the IV-VI group compound can be one or more of a binary compound selected from SnS, SnSe, SnTe, PbS, PbSe, PbTe, or a mixture thereof; a ternary compound selected from SnSeS, SnSeTe, SnSTe, PbSeS, PbSeTe, PbSTe, SnPbS, SnPbSe, SnPbTe, or a mixture thereof; or a quaternary compound selected from the group consisting of SnPbSSe, SnPbSeTe, SnPbSTe, or a mixture thereof. The IV group element is selected from Si, Ge, or a mixture thereof. The IV group compound includes a binary compound selected from SiC, SiGe, or a mixture thereof.

According to certain embodiments, one of the binary, ternary, or quaternary compounds is present at a uniform concentration in a particle, or a plurality of compounds are present at different concentrations in the same particle. In addition, a core/shell structure is provided in which one quantum dot surrounds another quantum. An interface between the core and the shell has a concentration gradient such that a concentration of an element present in the shell decreases as approaching a center of the core.

In certain embodiments, the quantum dot has a core-shell structure in which a shell encloses a core that includes nano-crystal as discussed above. The shell of the quantum dot is a protective layer that prevents chemical degeneration of the core, to maintain the core's semiconductor characteristics or as a charging layer that provides the quantum dot with electrophoretic properties. The shell may be a single layer or have multiple layers. An interface between the core and the shell has a concentration gradient such that a concentration of an element present in the shell decreases as approaching a center of the core. The shell of the quantum dot may be, for example, one of a metal oxide, a non-metal oxide, a semiconductor compound, or a combination thereof.

According to certain embodiments, the metal oxide or non-metal oxide can be a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, or NiO, or a ternary compound such as $MgAl_2O_4$, $CoFe_2O_4$, $NiFe_2O_4$, or $CoMn_2O_4$, but embodiments of the present inventive concepts are not limited thereto.

According to certain embodiments, the semiconductor compound can be CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, or a combination thereof, but embodiments of the present inventive concepts are not limited thereto.

According to certain embodiments, the quantum dot has a full width of half maximum (FWHM) of a light emitting wavelength spectrum, in which the FWHM falls within a range of less than about 45 nm, narrowly less than about 40 nm, and more narrowly less than about 30 nm, and color purity and/or color reproducibility improves in this range. In addition, light released through such quantum dot is emitted in various directions, which result in an improved, wider view angle.

According to certain embodiments, a quantum dot has a shape generally used in the art, but embodiments of the present inventive concepts are not limited thereto. For example, in other embodiments, the quantum dot can have a shape of a sphere, a pyramid, a multiple-branch type, a cubic nano-particle, a nano-tube, a nano-wire, a nano-fiber, or a nano-plate particle.

According to certain embodiments, a quantum dot can adjust a color of light emitted depending on a particle size thereof, and thus can emit various colors, such as blue, red, or green.

According to certain embodiments, the encapsulation layer TFE is disposed on the display device layer DP-EL. The encapsulation layer TFE may be a single layer or include a plurality of stacked layers.

According to certain embodiments, the display panel DP includes a front surface IS-DP, a flat part FP and a protruding part RP. The protruding part RP has a shape that protrudes from one side of the flat part FP in the direction of the first axis DR1. In certain embodiments, the protruding part RP includes a bendable part BP. In addition, the protruding part RP includes an opposite part OP on one side of the bendable part BP.

According to certain embodiments, the bendable part BP is capable of being bent about a bending axis BX that extends in a direction parallel to the second axis DR2. Referring to FIGS. 1 and 4, the bendable part BP can be bent in a direction toward a bottom surface of the display panel DP about the bending axis BX. In certain embodiments, the bendable part BP of the display panel DP can be bent to allow the opposite part OP to overlap the flat part FP of the display panel DP.

According to certain embodiments, when viewed in plan view or on a plane, the front surface IS-DP of the display panel DP is divided into an active area AA and a peripheral area NAA. The active area AA is where an image is displayed. In response to electrical signals, the display panel DP activates the active area AA. The activated active area AA displays an image. The transmission area TA of the window panel WP overlaps at least the entirety of the active area AA.

According to certain embodiments, the peripheral area NAA is adjacent to the active area AA. The peripheral area NAA surrounds the active area AA. However, this is exemplary and non-limiting, and in other embodiments, the peripheral area NAA is adjacent to only a portion of the edge of the active area AA.

According to certain embodiments, the peripheral area NAA includes one or more electronic devices or various signal lines that provide electrical signals to the active area AA. The peripheral area NAA is covered with the bezel area BZA and thus is not externally visible.

According to certain embodiments, the protruding part RP of the display panel DP corresponds to a portion of the peripheral area NAA adjacent to one side of the active area AA. A display connection line D-CL is disposed on a portion of the peripheral area NAA that corresponds to the protruding part RP. The display panel DP includes on the side that corresponds to the protruding part RP a display connection circuit board DFPC electrically connected to the display panel DP. The display connection circuit board DFPC connects the display panel DP to a display driver circuit board DMB which provides the display panel DP with driver signals.

According to certain embodiments, the display connection circuit board DFPC is electrically and physically coupled to the display panel DP through an adhesive member, such as an anisotropic conductive film. The display connection circuit board DFPC includes signal lines. In addition, the display driver circuit board DMB is coupled to the display panel DP, and thereafter can be bent toward the bottom surface of the display panel DP. In certain embodiments, the display connection circuit board DFPC is attached to the opposite part OP of the display panel DP. The opposite part OP and the display connection circuit board DFPC can be bent toward the bottom surface of the display panel DP so as to overlap the flat part FP of the display panel DP.

According to certain embodiments, the touch panel TP is disposed on the display panel DP in the display device DD. Referring to FIG. 4, the display device DD further includes a first adhesive layer AP1 between the display panel DP and the touch panel TP, and a second adhesive layer AP2 between the touch panel TP and the window panel WP. The first and second adhesive layers AP1 and AP2 include an optically clear adhesive.

According to certain embodiments, the display device DD further includes a polarizing layer POL on the display panel DP. The polarizing layer POL blocks external light incident to the display panel DP. The polarizing layer POL can partially block the external light. The polarizing layer POL reduces light being reflected at the display panel DP on which the external light is incident. For example, when the display panel DP both receives light from outside the display device DD and emits light, the polarizing layer POL blocks the reflected light. The polarizing layer POL may be a circular polarizer that prevents reflection, or may include a linear polarizer and λ/4 retarder.

According to other embodiments, different from that shown in FIG. 4, the touch panel TP is directly disposed on the display panel DP. The first adhesive layer AP1 is omitted, and in this case, the touch panel TP is directly disposed on the encapsulation layer TFE of the display panel DP.

According to certain embodiments, the touch panel TP can sense an external input and can obtain information about a position or intensity of the external input. For example, the external input may be a user's body, light, heat, pressure, or any of various other types of inputs. In addition, the touch panel TP can not only sense an input in contact with the touch panel TP, but sense an input in close vicinity or adjacent to the touch panel TP.

According to certain embodiments, the touch panel TP includes a sensing area SA and a non-sensing area NSA. The sensing area SA overlaps the active area AA. The non-sensing area NSA is adjacent to the sensing area SA. The non-sensing area NSA surrounds an edge of the sensing area SA and overlaps the peripheral area NAA. However, this is exemplary and non-limiting, and in other embodiments, the non-sensing area NSA is adjacent to only a portion of the edge of the sensing area SA or may be omitted.

Referring to FIG. 3, according to certain embodiments, the touch panel TP includes a plurality of sensing electrodes SEL1 and SEL2, a plurality of sensing lines SL1 and SL2, and a plurality of sensing pads TPD.

According to certain embodiments, the sensing electrodes SEL1 and SEL2 are disposed on the sensing area SA, and the sensing pads TPD are disposed on the non-sensing area NSA. A touch pad area TPA that includes the sensing pads TPD is disposed adjacent to one end of the touch panel TP.

According to certain embodiments, the sensing lines SL1 and SL2 are connected with the sensing electrodes SEL1 and SEL2, and extend toward the non-sensing area NSA and are connected with the sensing pads TPD. The sensing pads TPD are connected through the touch connection circuit board TFPC to the touch driver circuit board TMB that drives the touch panel TP.

According to certain embodiments, the sensing electrodes SEL1 and SEL2 and the sensing lines SL1 and SL2 may have a single-layered structure or a multi-layered structure in which conductive layers are upwardly stacked. The conductive layers of the multi-layered structure include two or more transparent conductive layers and metal layers. The conductive layers of the multi-layered structure include metal layers having different metals from each other. The transparent conductive layer includes at least one of ITO (indium tin oxide), IZO (indium zinc oxide), ZnO (zinc oxide), ITZO (indium tin zinc oxide), PEDOT, metal nanowire, or graphene. The metal layer includes at least one of molybdenum, silver, titanium, copper, aluminum, or an alloy thereof.

According to certain embodiments, the sensing electrodes SEL1 and SEL2 include a plurality of first sensing electrodes SEL1 that extend in first axis DR1 direction and are spaced apart in the second axis DR2 direction, and include a plurality of second sensing electrodes SEL2 that extend in the second axis DR2 direction and are spaced apart in the first axis DR1 direction. The sensing lines SL1 and SL2 include a plurality of first sensing lines SL1 connected to the first sensing electrodes SEL1 and a plurality of second sensing lines SL2 connected to the second sensing electrodes SEL2.

According to certain embodiments, the first sensing electrodes SEL1 intersect the second sensing electrodes SEL2 while being insulated from the second sensing electrodes SEL2. The first sensing electrodes SEL1 and the second sensing electrodes SEL2 have a mesh shape. Capacitors are created by the first sensing electrodes SEL1 and the second sensing electrodes SEL2.

According to certain embodiments, each of the first sensing electrodes SEL1 includes a plurality of first sensors SP1 spaced apart in the first axis DR1 direction and a plurality of first connectors CP1 that connect the first sensors SP1. The first sensors SP1 have a mesh shape. Each of the first connectors CP1 is disposed between two neighboring first sensors SP1 and electrically connects the two first sensors SP1 to each other.

According to certain embodiments, each of the second sensing electrodes SEL2 includes a plurality of second sensors SP2 spaced apart in the second axis DR2 direction and a plurality of second connectors CP2 that connect the second sensors SP2. The second sensors SP2 have a mesh shape. Each of the second connectors CP2 is disposed between two neighboring second sensors SP2 and electrically connects the two second sensors SP2 to each other.

According to certain embodiments, the first sensors SP1 and the second sensors SP2 are spaced apart from each other and placed alternately, while not overlapping each other. The second connectors CP2 intersect the first connectors CP1 while being insulated from the first connectors CP1. The first and second sensors SP1 and SP2 and the second connectors CP2 are located at the same layer. The first connectors CP1 are located at a different layer from the first and second sensors SP1 and SP2 and the second connectors CP2.

According to certain embodiments, a dielectric layer is disposed between the first connectors CP1 and the second connectors CP2. The first connectors CP1 are connected to the first sensors SP1 though contact holes formed in the dielectric layer. The second connectors CP2 are unitarily formed with corresponding second sensors SP2.

According to certain embodiments, the display device DD includes the protective layer RS on one surface of the touch connection circuit board TFPC. Referring to FIG. 4, the protective layer RS overlaps the protruding part RP of the display panel DP. For example, the protective layer RS overlaps the bendable part BP of the display panel DP. The touch connection circuit board TFPC has the protective layer RS on its surface closest to the display panel DP.

According to certain embodiments, the protective layer RS protects the touch connection circuit board TFPC. The protective layer RS can prevent cracks in connection lines T-CL, shown in FIG. 6, exposed on a bendable portion where the touch connection circuit board TFPC is bent, and to prevent connection lines T-CL of FIG. 6 from coming in contact with neighboring other members at the bendable portion.

Figure 5:
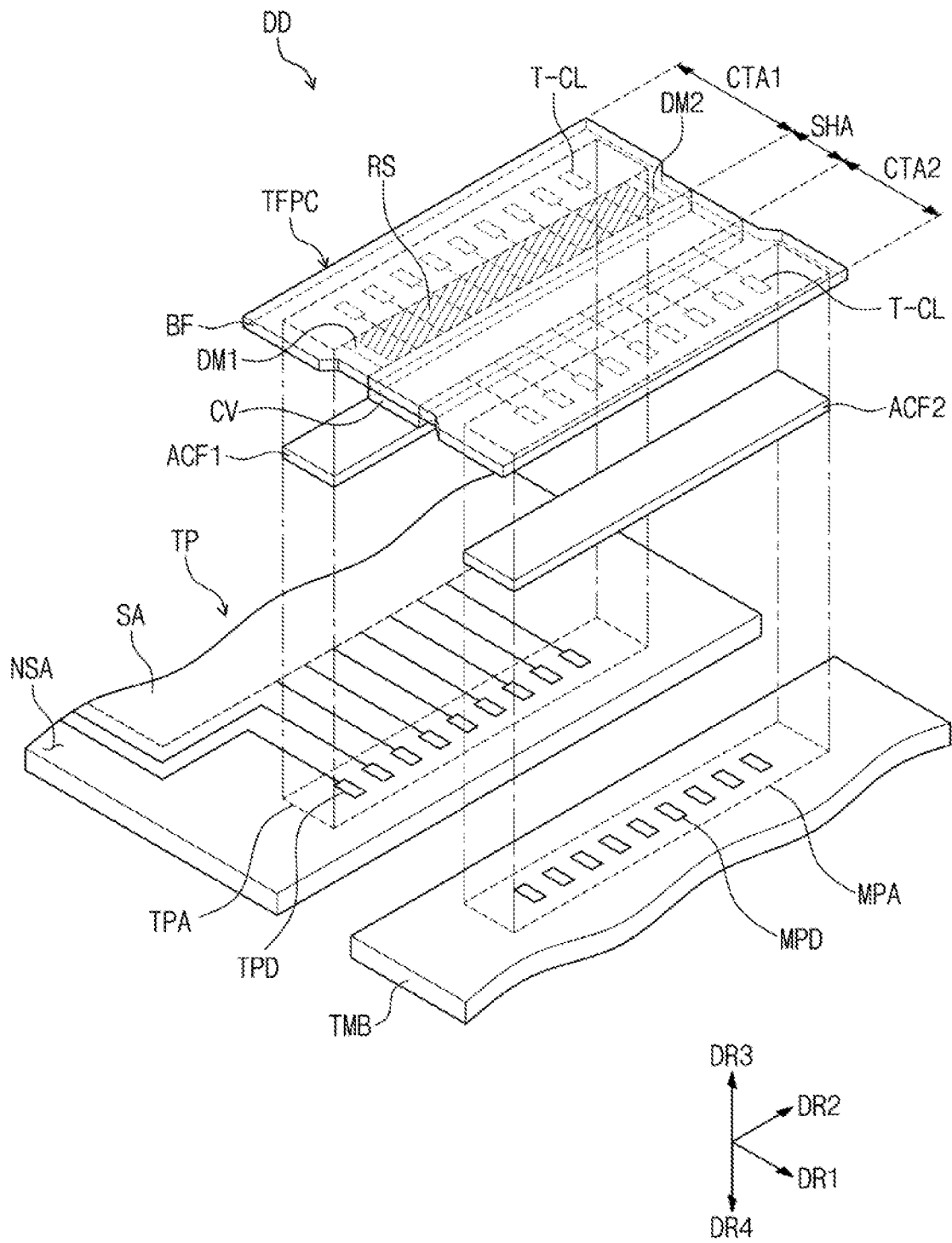
FIG. 5 is an exploded perspective view that partially shows a display device according to some exemplary embodiments.
Figure 6:
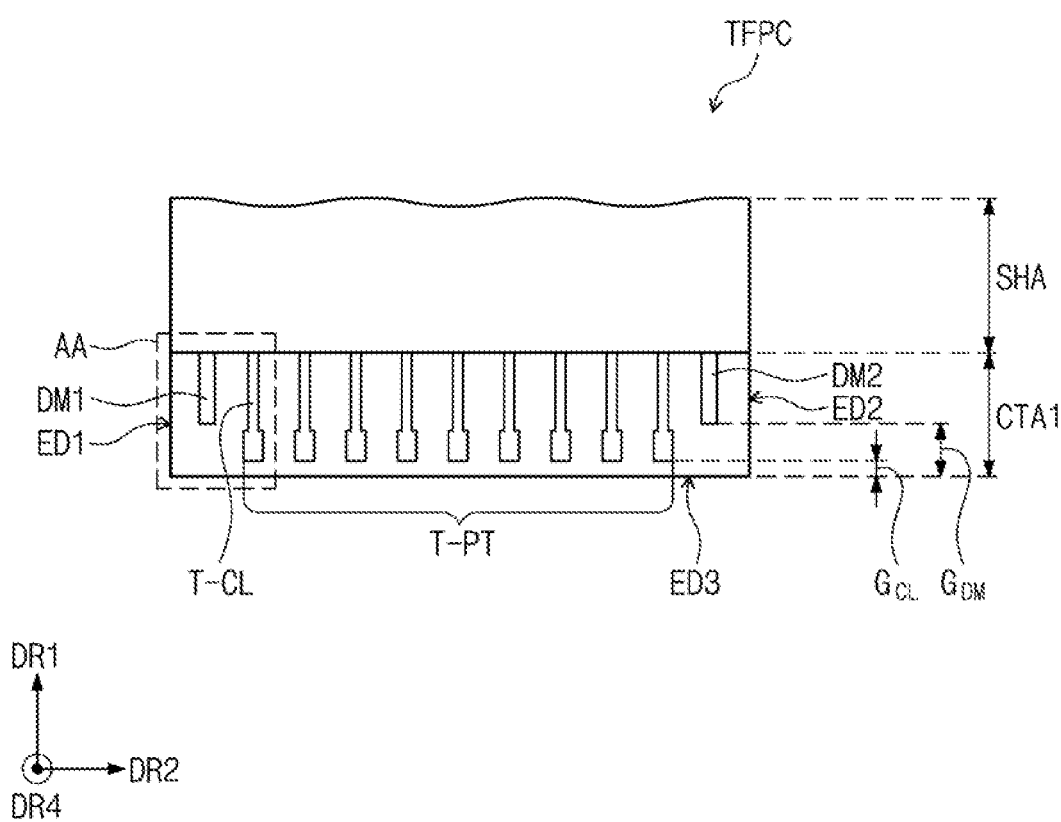
FIG. 6 is a plan view of a touch connection circuit board according to some exemplary embodiments.
Figure 7:
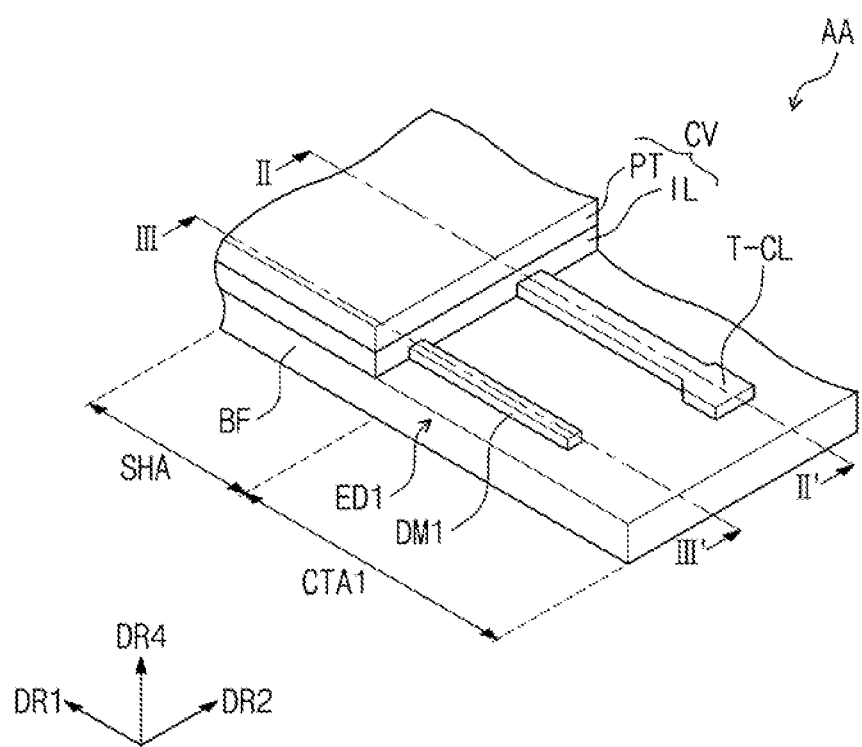
FIG. 7 is a perspective view that partially shows a touch connection circuit board according to some exemplary embodiments.
Figure 8A:
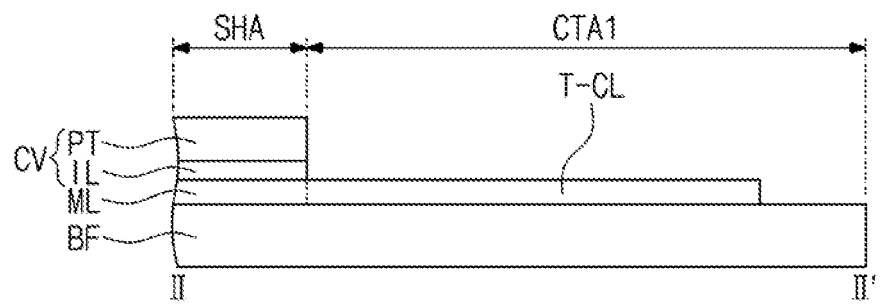
FIG. 8A is a cross-sectional view taken along line II-II' of FIG. 7.
Figure 8A:
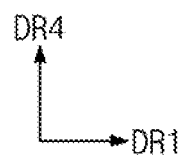
Figure 8B:
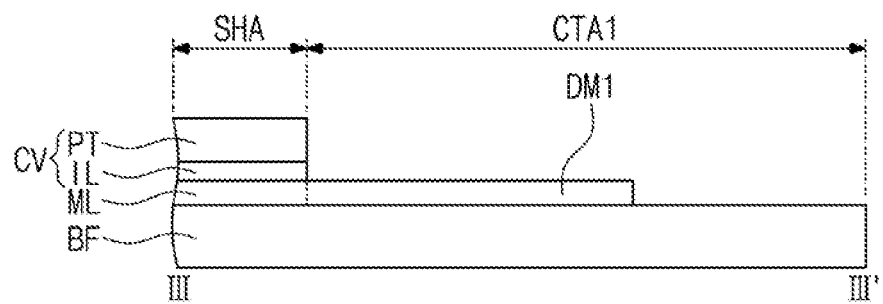
FIG. 8B is a cross-sectional view taken along line III-III' of FIG. 7.
Figure 8B:
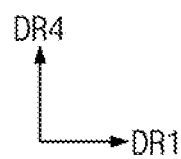

FIG. 5 is an exploded perspective view that partially shows a display device according to some exemplary embodiments. FIG. 6 is a plan view of a touch connection circuit board according to some exemplary embodiments. FIG. 7 is a perspective view that partially shows a touch connection circuit board according to some exemplary embodiments. FIG. 8A is a cross-sectional view of a connection line of a touch connection circuit board according to some exemplary embodiments. FIG. 8B is a cross-sectional view of a dummy pattern of a touch connection circuit board according to some exemplary embodiments.

FIG. 5 is an exploded perspective view of a connection section between the touch panel TP, the touch connection circuit board TFPC, and the touch driver circuit board TMB in the display device DD according to some exemplary embodiments.

According to certain embodiments, the sensing pads TPD are electrically connected through the touch connection circuit board TFPC to the touch driver circuit board TMB. The sensing pads TPD include a metal oxide or a metal, such as copper (Cu), silver (Si), or gold (Au). For example, the sensing pads TPD are made of a transparent metal oxide that includes one or more of ITO (indium tin oxide), IZO (indium zinc oxide), ITZO (indium tin zinc oxide), ZTO (zinc tin oxide), or ATO (antimony tin oxide).

According to certain embodiments, the touch connection circuit board TFPC includes a shield area SHA and connection areas CTA1 and CTA2. A first connection area CTA1 is disposed on one side of the shield area SHA, and a second connection area CTA2 is disposed on other side of the shield area SHA. FIG. 5 and other figures show the first connection area CTA1 and the second connection area CTA2 as disposed symmetrically to each other about the shield area SHA, but embodiments of the present inventive concepts are not limited thereto. The first connection area CTA1 and the second connection area CTA2 can differ in terms of area or shape. The shield area SHA of the touch connection circuit board TFPC includes a base film BF and a cover layer CV, while in the connection areas CTA1 and CTA2, the cover layer CV is removed and connection lines T-CL are exposed. The connection lines T-CL are formed on a surface of the base film that faces the touch panel TP.

According to certain embodiments, on the first connection area CTA1, the connection lines T-CL of the touch connection circuit board TFPC are coupled to the sensing pads TPD of the touch panel TP. On the first connection area CTA1, exposed ends of the connection lines T-CL overlap the touch pad area TPA on which the sensing pads TPD are disposed. In addition, on the second connection area CTA2, exposed ends of the connection lines T-CL are coupled to driver pads MPD of the touch driver circuit board TMB and overlap a driver pad area MPA on which the driver pads MPD are disposed.

According to certain embodiments, the touch panel TP, the touch connection circuit board TFPC, and the touch driver circuit board TMB are electrically connected to each other through coupling members ACF1 and ACF2. The coupling members ACF1 and ACF2 are adhesive and electrical conductive. The coupling members ACF1 and ACF2 include a thermosetting or photocurable material. For example, the coupling members ACF1 and ACF2 include an anisotropic conductive film.

According to certain embodiments, a first coupling member ACF1 is disposed between the touch panel TP and the touch connection circuit board TFPC, and a second coupling member ACF2 is disposed between the touch driver circuit board TMB and the touch connection circuit board TFPC. The first coupling member ACF1 and the second coupling member ACF2 are the same as each other. Alternatively, the first coupling member ACF1 and the second coupling member ACF2 differ from each other.

According to certain embodiments, the protective layer RS overlaps a portion of the first connection area CTA1. The protective layer RS overlaps a line pattern section T-PT. The protective layer RS is disposed on a surface of the touch connection circuit board TFPC on which the connection lines T-CL are exposed.

According to certain embodiments, the protective layer RS covers and protects the connection lines T-CL. When the touch connection circuit board TFPC is bent, the protective layer RS prevents cracks in the portion of the connection lines T-CL disposed on the bendable portion, and prevents contaminants such as moisture from being introduced into the connection lines T-CL and the touch connection circuit board TFPC. Moreover, the protective layer RS protects the touch connection circuit board TFPC against external impacts or vibrations.

According to certain embodiments, the protective layer RS is formed of one or more of an acryl-based polymer, a silicone-based polymer, or an imide-based polymer. The protective layer RS has a Young's modulus of 500 MPa to 1200 MPa, and is thus sufficiently flexible to withstand crack formation and resist impacts to protect the touch connection circuit board TFPC against external impacts.

According to certain embodiments, the protective layer RS is formed by providing a polymer resin that includes one or more of an acryl-based polymer, a silicone-based polymer, or an imide-based polymer, and then curing the polymer resin. The polymer resin further includes a photoinitiator or a thermal initiator, and can be cured and solidified by heat or ultraviolet irradiation.

According to certain embodiments, the polymer resin is provided in a liquid state and has a viscosity of 1000 cps or less. For example, the polymer resin has a viscosity of 400 cps to 700 cps. The protective layer RS formed of a low viscosity polymer resin is thin. The protective layer RS has an average thickness of 100 μm or less. The average thickness of the protective layer RS is an arithmetic mean of a minimum thickness from a top side of the protective layer RS to a surface of the base film BF of the touch connection circuit board TFPC on which is provided with the protective layer RS.

According to certain embodiments, the protective layer RS has a thickness which decreases as it approaches opposite edges ED1 and ED2 from a center of the touch connection circuit board TFPC. The protective layer RS is thinnest at portions that neighbor first and second dummy patterns DM1 and DM2, and thickest at its central portion.

Referring back to FIG. 4, according to certain embodiments, the touch connection circuit board TFPC may be provided in a state of being bent about the bending axis BX of the display device DD. In this case, a polymer resin that forms the protective layer RS is disposed onto the connection lines T-CL before the touch connection circuit board TFPC is bent, and then the touch connection circuit board TFPC is bent after the polymer resin is cured.

According to certain embodiments, the touch connection circuit board TFPC includes the base film BF, and the first dummy pattern DM1, the second dummy pattern DM2, and the line pattern section T-PT, which are disposed on the base film BF. The touch connection circuit board TFPC includes the shield area SHA and the connection areas CTA1 and CTA2, and the first dummy pattern DM1, the second dummy pattern DM2, and the line pattern section T-PT are exposed on the first connection area CTA1.

According to certain embodiments, the line pattern section T-PT includes a plurality of connection lines T-CL. The connection lines T-CL extend in the first axis DR1 direction.

According to certain embodiments, the connection lines T-CL exposed on the first connection area CTA1 extend toward an end ED3 of the touch connection circuit board TFPC. The connection lines T-CL overlap the sensing pads TPD on the touch pad area TPA of the touch panel TP. In comparison with that discussed above, the first and second dummy patterns DM1 and DM2 extend toward the end ED3 of the touch connection circuit board TFPC, but do not overlap the touch pad area TPA.

In certain embodiments, a minimum distance $G_{DM}$ from the end ED3 either to the first dummy pattern DM1 or to the second dummy pattern DM2 on the first connection area CTA1 is greater than a minimum distance $G_{CL}$ from the end ED3 to the connection line T-CL on the first connection area CTA. For example, the dummy patterns DM1 and DM2 are shorter in the first axis DR1 direction than the connection lines T-CL, and thus the dummy patterns DM1 and DM2 are not electrically coupled to the sensing pads TPD of the touch panel TP.

In certain embodiments, the base film BF included in the touch connection circuit board TFPC is formed of a flexible material, such as polyimide. The base film BF is provided as a film.

According to certain embodiments, the touch connection circuit board TFPC includes a metal layer ML on the base film BF and at least one cover layer CV on the metal layer ML. The base film BF, the metal layer ML, and the at least one cover layer CV are sequentially stacked in a thickness direction parallel to the fourth axis DR4 direction.

According to certain embodiments, on the shield area SHA, the metal layer ML is disposed on an entire surface of the base film BF, or the metal layer ML can be provided as a patterned type. The metal layer ML is formed of a metal or a metal oxide. The connection line T-CL is a portion of the metal layer ML, which extends onto and is patterned on the first connection area CTA.

According to certain embodiments, the connection line T-CL and the metal layer ML are formed of a metal or a metal oxide. For example, the connection line T-CL and the metal layer ML are each formed of one or more of molybdenum, gold, silver, titanium, copper, aluminum, or a combination thereof. Alternatively, the connection line T-CL and the metal layer ML are formed of a metal oxide, such as ITO (indium tin oxide), IZO (indium zinc oxide), ZnO (zinc oxide), or ITZO (indium tin zinc oxide).

According to certain embodiments, the connection line T-CL is a metal pattern layer. The connection line T-CL as a metal pattern layer may have a single-layered structure formed of a single material, a single-layered structure formed of a plurality of different materials, or a multi-layered structure having a plurality of layers that include different materials.

According to certain embodiments, the first dummy pattern DM1 is disposed adjacent to one edge ED1 of the touch connection circuit board TFPC. The second dummy pattern DM2 is disposed adjacent to other edge ED2 of the touch connection circuit board TFPC. When viewed in plan or on a plane, the first dummy pattern DM1 and the second dummy pattern DM2 are spaced apart from each other, and are disposed on opposite sides of the line pattern section T-PT. In FIGS. 5, 6, and other figures, the dummy patterns DM1 and DM2 are illustrated as lying on the first connection area CTA1, but embodiments of the present inventive concepts are not limited thereto. For example, in other embodiments, the dummy patterns DM1 and DM2 are additionally provided on the second connection area CTA2. In this description, the protective layer RS is illustrated as covering the connection lines T-CL exposed on the first connection area CTA1, but embodiments of the present inventive concepts are not limited thereto. In other embodiments, the protective layer RS is additionally provided to cover the connection lines T-CL exposed on the second connection area CTA2.

In certain embodiments, the line pattern section T-PT is disposed between the first dummy pattern DM1 and the second dummy pattern DM2. The first dummy pattern DM1, the second dummy pattern DM2, and the connection lines T-CL are spaced apart from each other in the second DR2 direction intersecting the first axis DR1 direction along which the connection lines T-CL extend.

According to certain embodiments, the touch connection circuit board TFPC is provided on its opposite sides with the first dummy pattern DM1 and the second dummy pattern DM2, which serve as dams that prevent the polymer resin that forms the protective layer RS from flowing toward lateral surfaces of the touch connection circuit board TFPC. The first dummy pattern DM1 and the second dummy pattern DM2 are disposed on opposite sides of the line pattern section T-PT, and prevent overflow of the protective layer RS that covers the line pattern section T-PT. The touch connection circuit board TFPC that includes the first and second dummy patterns DM1 and DM2 can suppress the occurrence of foreign substances and cracks that can be caused by the protective layer RS when it overflows, which results in improved reliability of the display device DD.

According to certain embodiments, the first and second dummy patterns DM1 and DM2 are formed of the same material as the connection lines T-CL. The first and second dummy patterns DM1 and DM2 are metal patterns formed of the same material as the connection lines T-CL.

Referring to FIGS. 7 and 8A, according to certain embodiments, the metal layer ML on the shield area SHA has an extended portion exposed on the first connection area CTA1, and the connection lines T-CL are the extended portion of the metal layer ML. For example, in certain embodiments, the connection line T-CL and the metal layer ML are integrated into a single body.

Referring to FIGS. 7 and 8B, according to certain embodiments, the metal layer ML on the shield area SHA has an extended portion exposed on the first connection area CTA1, and the first dummy pattern DM1 are the extended portion of the metal pattern ML. For example, in certain embodiments, the first dummy pattern DM1 and the metal layer ML are integrated into a single body.

According to certain embodiments, the at least one cover layer CV includes a dielectric layer IL and a printed layer PT. In addition to the dielectric layer IL and the printed layer PT, a shield layer is further included in the cover layer CV of the touch connection circuit board TFPC.

According to certain embodiments, the dielectric layer IL is disposed on the metal layer ML. The dielectric layer IL protects the metal layer ML, or insulates patterned metal layers ML from each other. The dielectric layer IL covers the metal layer ML.

According to certain embodiments, the printed layer PT is disposed on the dielectric layer IL. The printed layer PT is a protective coating layer that protects the dielectric layer IL and the metal layer ML. The printed layer PT is an uppermost layer of the touch connection circuit board TFPC. The printed layer PT is highly heat-resistant and thus protects the dielectric layer IL and the metal layer ML when a soldering process is performed.

FIG. 8B illustrates a cross-section of the first dummy pattern DM1 according to certain embodiments, but like the first dummy pattern DM1, the second dummy pattern DM2 is an extended portion of the metal layer ML in the touch connection circuit board TFPC. The following descriptions of first dummy patterns DM1-1, DM1-1a, DM1-2, and DM1-2a with reference to FIGS. 9, 10, 11A, and 11B are also applicable to the second dummy pattern DM2.

According to certain embodiments, the first and second dummy patterns DM1 and DM2 extend parallel to the first axis DR1, but do not overlap the touch pad area TPA, with the result that the first and second dummy patterns DM1 and DM2 have no electrical connection with the touch panel TP.

Figure 9:
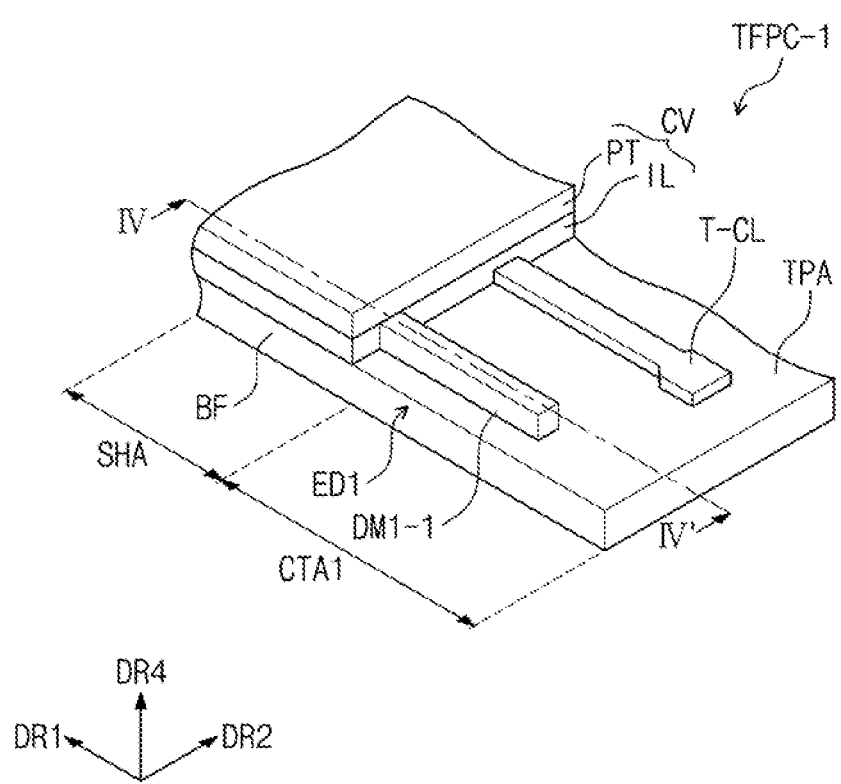
FIG. 9 is a perspective view that partially shows a touch connection circuit board according to some exemplary embodiments.
Figure 10A:
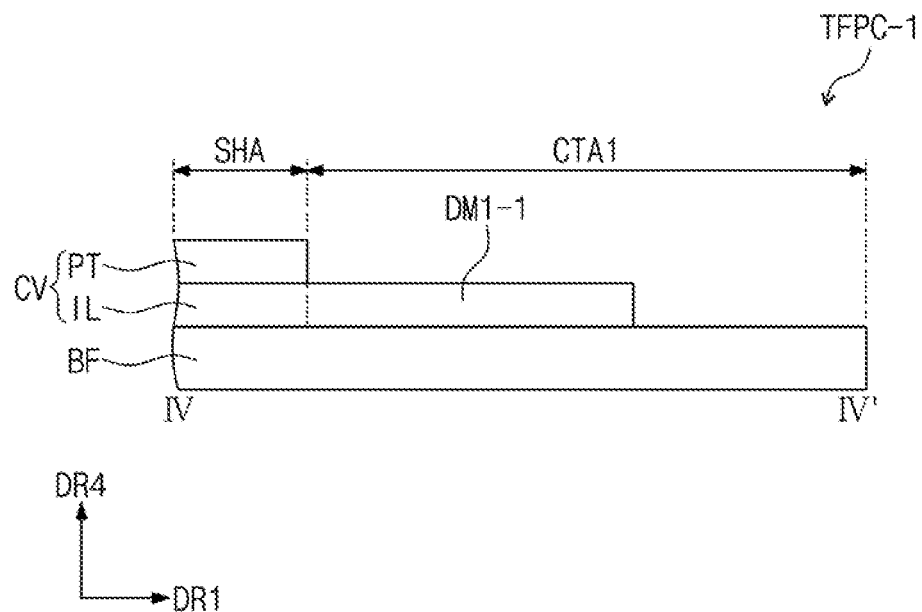
FIG. 10A is a cross-sectional view taken along line IV-IV' of FIG. 9.
Figure 10B:
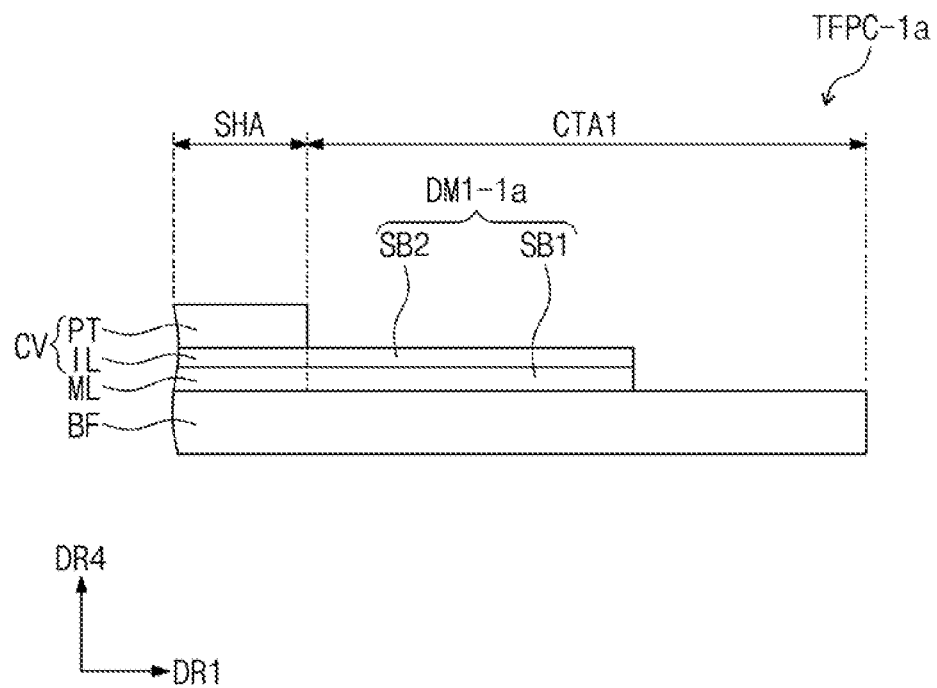
FIG. 10B is a cross-sectional view that partially shows a touch connection circuit board according to some exemplary embodiments.

FIG. 9 is a perspective view that partially shows a touch connection circuit board according to some exemplary embodiments. FIG. 10A is a cross-sectional view taken along line IV-IV' of FIG. 9. FIG. 10B is a cross-sectional view that partially shows a touch connection circuit board according to some exemplary embodiments.

Referring to FIGS. 9 and 10A, a touch connection circuit board TFPC-1 according to some exemplary embodiments includes a first dummy pattern DM1-1 that corresponds to an extended portion of the cover layer CV. The first dummy pattern DM1-1 is formed of the same material as the dielectric layer IL. The first dummy pattern DM1-1 is an extended portion of the dielectric layer IL. The first dummy pattern DM1-1 and the dielectric layer IL are integrated into a single body.

FIG. 10B is a cross-sectional view of a touch connection circuit board TFPC-1a according to some exemplary embodiments. Referring to FIG. 10B, a first dummy pattern DM1-1a includes the metal layer ML and the cover layer CV. The first dummy pattern DM1-1a includes the metal layer ML and the dielectric layer IL on the metal layer ML. The first dummy pattern DM1-1a includes a first sub-layer SB1 that extends from the metal layer ML and a second sub-layer SB2 that extends from the dielectric layer IL. The first sub-layer SB1 and the second sub-layer SB2 extend on the touch connection circuit board TFPC-1a in a direction parallel to the first axis DR1 while being coupled to each other.

Figure 11A:
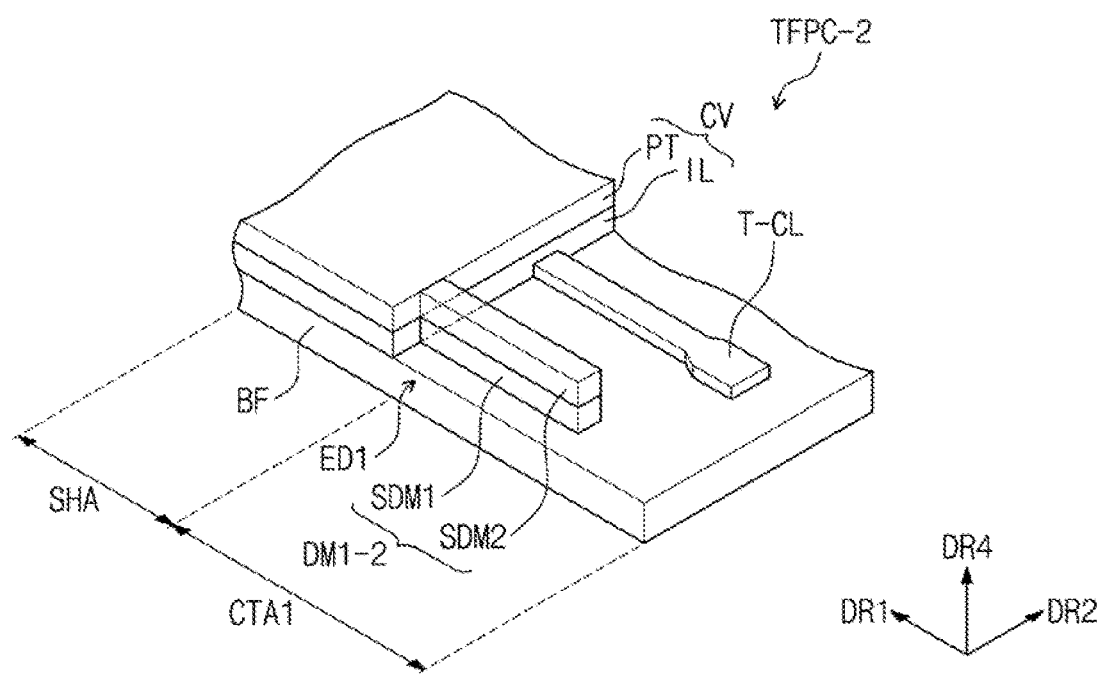
FIGS. 11A and 11B are perspective views that partially show a touch connection circuit board according to some exemplary embodiments.
Figure 11B:
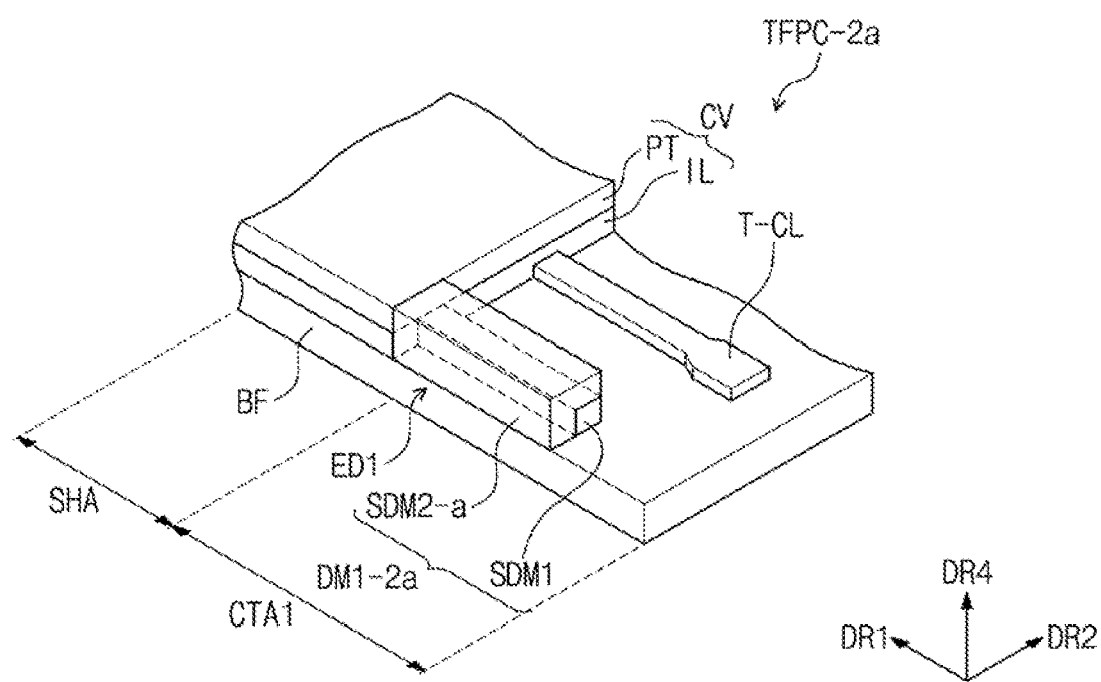

FIGS. 11A and 11B are perspective views of a touch connection circuit board according to some exemplary embodiments. The descriptions of the touch connection circuit boards discussed with reference to FIGS. 6 to 8B are applicable to the connection line T-CL, the base film BF, the dielectric layer IL, and the printed layer PT of the touch connection circuit boards TFPC-2 and TFPC-2a according to some exemplary embodiments shown in FIGS. 1A and 11B.

According to certain embodiments, the touch connection circuit board TFPC-2 shown in FIG. 11A includes a first dummy pattern DM1-2 that includes a first sub-dummy layer SDM1 that extends from the dielectric layer IL and a second sub-dummy layer SDM2 that extends from the printed layer PT. The second sub-dummy layer SDM2 is disposed on the first sub-dummy layer SDM1. The first sub-dummy layer SDM1 extends from the dielectric layer IL on the shield area SHA, such that the first sub-dummy layer SDM1 and the dielectric layer IL are integrated into a single body. The second sub-dummy layer SDM2 extends from the printed layer PT on the shield area SHA, such that the second sub-dummy layer SDM2 and the printed layer PT are integrated into a single body.

According to certain embodiments, the first sub-dummy layer SDM1 and the second sub-dummy layer SDM2 extend in a direction parallel to the first axis DR1 while being stacked, and thus a single first dummy pattern DM1-2 may be formed.

Referring to FIG. 11B, according to certain embodiments, the touch connection circuit board TFPC-2a includes a first dummy pattern DM1-2a that includes a sub-dummy layer SDM1 that extends from the dielectric layer IL and a cover dummy layer SDM2-a that covers top and lateral surfaces of the sub-dummy layer SDM1. The sub-dummy layer SDM1 and the dielectric layer IL are integrated into a single body that extends on the shield area SHA. The cover dummy layer SDM2-a is formed of the same material as that of the printed layer PT.

A dummy pattern included in any touch connection circuit board according to some exemplary embodiments can include one or more combinations of the dummy patterns DM1, DM1-1, DM1-1a, DM1-2, and DM1-2a described with reference to FIGS. 7 to 11B. In addition, various stacked structures can be diversely combined and provided as dummy patterns of touch connection circuit boards, but embodiments of the present inventive concepts are not limited thereto.

Figure 12A:
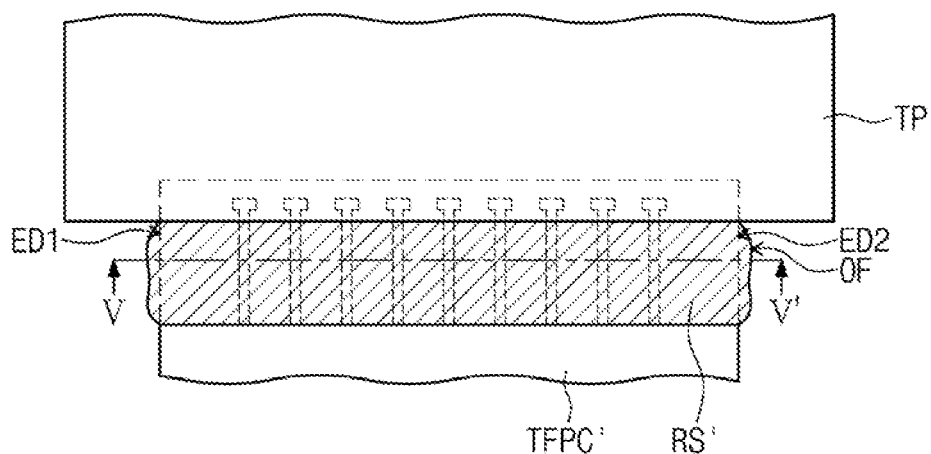
FIG. 12A is a plan view that partially shows a display device according to a related art.
Figure 12B:
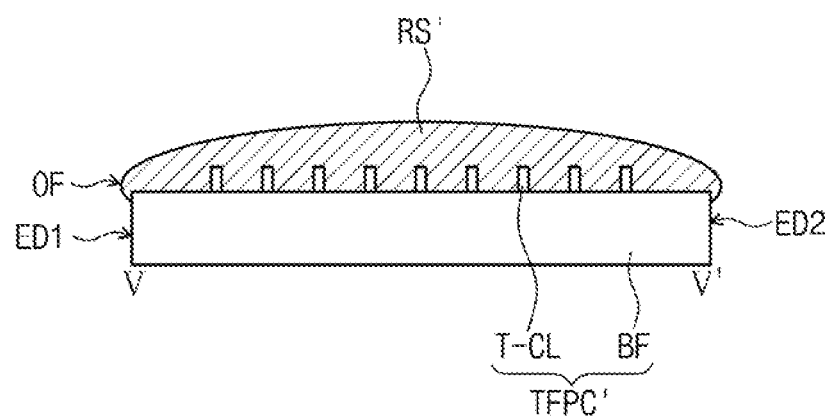
FIG. 12B is a cross-sectional view taken along line V-V' of FIG. 12A.
Figure 13A:
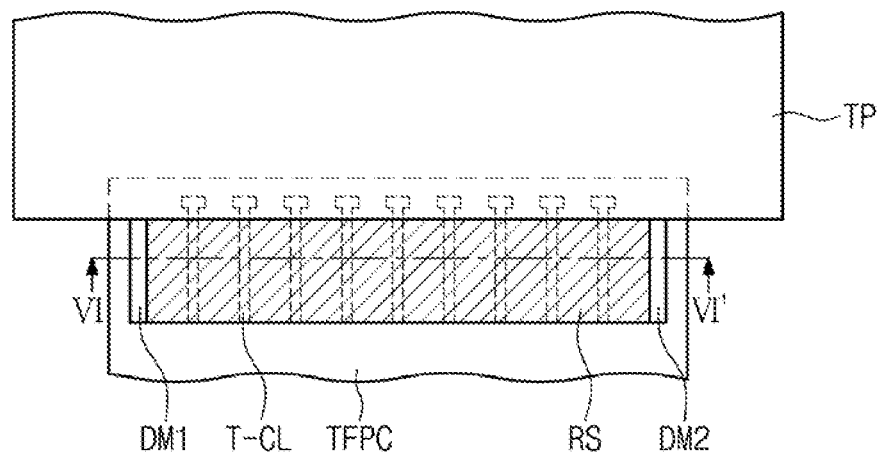
FIG. 13A is a plan view that partially shows a display device according to some exemplary embodiments.
Figure 13B:
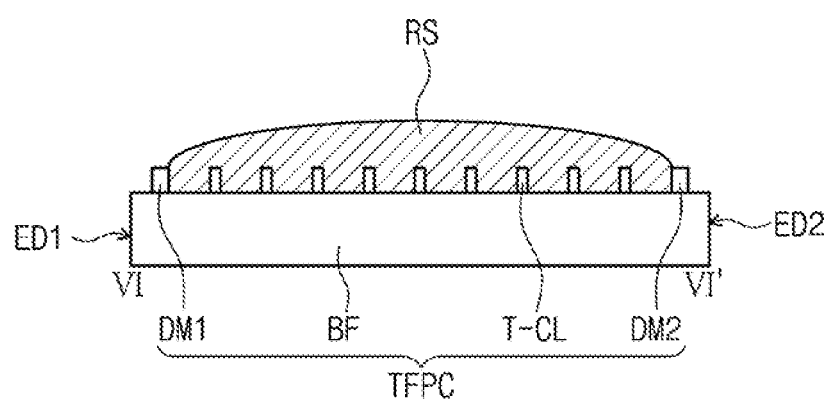
FIG. 13B is a cross-sectional view taken along line VI-VI' of FIG. 13A.

FIG. 12A illustrates a plan view partially showing the touch panel TP and a touch connection circuit board TFPC' according to a related art. FIG. 12B illustrates a cross-sectional view taken along line V-V' of FIG. 12A. FIG. 13A illustrates a plan view partially showing the touch panel TP and the touch connection circuit board TFPC according to some exemplary embodiments. FIG. 13B illustrates a cross-sectional view taken along line VI-VI' of FIG. 13A.

Referring to FIGS. 12A and 12B, when the touch connection circuit board TFPC' according to a related art is used which includes no dummy pattern, a protective layer RS' may include protrusions OF that protrude outwardly from edges ED1 and ED2 of the touch connection circuit board TFPC'. The protrusions OF that protrude from the edges ED1 and ED2 of the touch connection circuit board TFPC' can easily detach from the touch connection circuit board TFPC', and then act as foreign substances in display device fabrication. The protrusions OF of the protective layer RS' that are not supported by the touch connection circuit board TFPC' are vulnerable to external impacts, and thus cracks can easily form and propagate through an entirety of the protective layer RS', which can reduce the reliability of a display device.

In contrast, according to an embodiment shown in FIGS. 13A and 13B, because dummy patterns DM1 and DM2 are included on opposite edges ED1 and ED2 of the touch connection circuit board TFPC according to some exemplary embodiments, the protective layer RS can be prevented from protruding outwardly from the edges ED1 and ED2 of the touch connection circuit board TFPC. In this case, the protective layer RS covers the connection lines T-CL between the first dummy pattern DM1 and the second dummy pattern DM2. The first dummy pattern DM1 and the second dummy pattern DM2 serve as dams that prevent the protective layer RS from protruding toward the edges ED1 and ED2 of the touch connection circuit board TFPC. Accordingly, a display device according to some exemplary embodiments includes a touch connection circuit board having dummy patterns disposed adjacent to opposite edges, and thus exhibits improved reliability.

In addition, the dummy patterns disposed on a touch connection circuit board prevent lateral flow of a polymer resin used to form the protective layer. Thus, a low viscosity polymer resin can be used to form the protective layer on the touch connection circuit board, and as a result, to allow the protective layer to be thin. The thinness of the protective layer allows the touch connection circuit board to be easily bent, and therefore, it is possible to minimize a bezel area that overlaps the touch connection circuit board and to reduce dead spaces in the display devices.

A display device according to some exemplary embodiments includes a touch panel and a touch connection circuit board, and further includes dummy patterns disposed adjacent to opposite sides of the touch connection circuit board, and therefore a protective layer that protects the touch connection circuit board can be prevented from protruding outward from the touch connection circuit board. Hence, foreign substances and cracks resulting from the protrusion of the protective layer can be minimized to improve reliability of the display device.

According to some exemplary embodiments, a touch connection circuit board includes dummy patterns disposed adjacent to opposite edges thereof and also includes a protective layer between the dummy patterns, which provide the display device with improved reliability.

Furthermore, the dummy patterns disposed adjacent to the opposite edges of the touch connection circuit board prevent flow of a polymer resin used to form the protective layer, improving reliability of the display device.

Although embodiments have been described with reference to a number of illustrative exemplary embodiments thereof, it will be understood by those of ordinary skill in the art that various changes in form and detail may be made without departing from the spirit and scope of embodiments of the present inventive concepts as set forth in the following claims.

Thus, the technical scope of embodiments of the present inventive concepts is not limited by the exemplary embodiments described above, but by the following claims.

What is claimed is:

1. A display device, comprising:
   a display panel that includes a flat part and a protruding part adjacent to one side of the flat part;
   a touch panel disposed on the display panel;
   a touch connection circuit board disposed at one side of the touch panel and that is electrically connected to the touch panel; and
   a protective layer disposed on one surface of the touch connection circuit board and that overlaps the protruding part of the display panel,
   wherein the touch connection circuit board includes:
      a base film;
      a first dummy pattern disposed on the base film and adjacent to one edge of the base film;
      a second dummy pattern disposed on the base film and adjacent to an other edge of the base film; and
      a line pattern section disposed between the first dummy pattern and the second dummy pattern,
   wherein the protective layer covers the line pattern section between the first dummy pattern and the second dummy pattern.

2. The display device of claim 1,
   wherein the protruding part includes a bendable part that is configured to be bent about a bending axis that extends in one direction,
   wherein the protective layer overlaps the bendable part.

3. The display device of claim 1, wherein the line pattern section includes a plurality of connection lines that extend in a first direction,
   wherein the first dummy pattern, the connection lines, and the second dummy pattern are spaced apart from each other in a second direction that intersects the first direction.

4. The display device of claim 3, wherein the first dummy pattern and the second dummy pattern include a same material as the connection lines.

5. The display device of claim 3, wherein the touch connection circuit board further includes at least one cover layer disposed on the base film.

6. The display device of claim 5, wherein each of the first dummy pattern and the second dummy pattern extends from the at least one cover layer.

7. The display device of claim 5, wherein the at least one cover layer includes a dielectric layer that covers the connection lines,
   wherein each of the first dummy pattern and the second dummy pattern is integrated into a single body together with the dielectric layer.

8. The display device of claim 5,
   wherein the at least one cover layer includes:

a dielectric layer that covers the connection lines; and
a printed layer disposed on the dielectric layer, and
wherein each of the first dummy pattern and the second dummy pattern includes:
a first sub-dummy layer integrated into a single body together with the dielectric layer; and
a second sub-dummy layer disposed on the first sub-dummy layer and integrated into a single body together with the printed layer.

9. The display device of claim 5,
wherein the at least one cover layer includes:
a dielectric layer that covers the connection lines; and
a printed layer disposed on the dielectric layer, and
wherein each of the first dummy pattern and the second dummy pattern includes:
a sub-dummy layer integrated into a single body together with the dielectric layer; and
a cover dummy layer that covers a top surface and a lateral surface of the sub-dummy layer,
wherein the cover dummy layer includes a same material as the printed layer.

10. The display device of claim 1, wherein the touch connection circuit board includes a shield area and a connection area adjacent to the shield area,
wherein the first dummy pattern, the second dummy pattern, and the line pattern section are disposed on the connection area, and
wherein a minimum distance from one end of the connection area to the first dummy pattern or the second dummy pattern is greater than a minimum distance from the one end of the connection area to the line pattern section.

11. The display device of claim 1, wherein the touch panel includes a sensing area and a non-sensing area, wherein the touch panel further includes
a sensing electrode disposed on the sensing area,
a sensing pad disposed on the non-sensing area, and
a sensing line that connects the sensing electrode and the sensing pad to each other.

12. The display device of claim 11, wherein
the touch connection circuit board is electrically connected to the sensing pad, and
the touch connection circuit board is configured to be bent in a direction toward a bottom surface of the touch panel.

13. The display device of claim 11, further comprising a coupling member formed between the sensing pad and the touch connection circuit board.

14. The display device of claim 1, further comprising a window panel disposed on the touch panel, wherein the window panel includes a transmission area and a bezel area that surrounds the transmission area,
wherein the protective layer overlaps the bezel area.

15. A display device, comprising:
a display panel that includes a flat part and a bendable part adjacent to one side of the flat part, wherein the bendable part is configured to be bent about a bending axis that extends in one direction;
a touch panel disposed on the display panel;
a touch connection circuit board disposed at on one side of the touch panel and electrically connected to the touch panel, wherein the touch connection circuit board is configured to be bent in a direction toward a bottom surface of the touch panel; and
a protective layer disposed on the touch connection circuit board and that overlaps the bendable part,
wherein the touch connection circuit board includes:
a base film;
a first dummy pattern disposed on the base film and adjacent to one edge of the base film;
a second dummy pattern disposed on the base film and adjacent to an other edge of the base film; and
a plurality of connection lines disposed between the first dummy pattern and the second dummy pattern,
wherein the protective layer covers the connection lines between the first dummy pattern and the second dummy pattern.

16. The display device of claim 15, wherein the first dummy pattern and the second dummy pattern include a same material as the connection lines.

17. The display device of claim 15, wherein the touch connection circuit board further includes at least one cover layer disposed on the base film,
wherein each of the first dummy pattern and the second dummy pattern extends from the at least one cover layer.

18. The display device of claim 15, wherein the touch connection circuit board includes a shield area and a connection area adjacent to the shield area,
wherein the first dummy pattern, the second dummy pattern, and the connection lines are disposed on the connection area.

19. A display device, comprising:
a touch panel;
a touch connection circuit board disposed at one side of the touch panel and that is electrically connected to the touch panel, wherein the touch connection circuit board is configured to be bent about a bending axis that extends in one direction; and
a protective layer disposed on one surface of the touch connection circuit board,
wherein the touch connection circuit board includes:
a base film;
a first dummy pattern disposed on the base film and adjacent to one edge of the base film;
a second dummy pattern disposed on the base film and adjacent to an other edge of the base film;
a line pattern section disposed between the first dummy pattern and the second dummy pattern, and
at least one cover layer disposed on the base film,
wherein each of the first dummy pattern and the second dummy pattern extends from the at least one cover layer, and
wherein the protective layer covers the line pattern section between the first dummy pattern and the second dummy pattern.

20. The display device of claim 19, further comprising:
a display panel that includes a flat part and a protruding part adjacent to one side of the flat part, wherein the touch panel is disposed on the display panel, and the protruding part overlaps the protective layer,
wherein the protruding part includes a bendable part that is configured to be bent about the bending axis, and
wherein the protective layer overlaps the bendable part.

* * * * *